United States Patent [19]

Bjorklund et al.

[11] 3,990,313
[45] Nov. 9, 1976

[54] METHOD AND APPARATUS FOR SERIAL DILUTIONS

[76] Inventors: Knut Bertil Björklund; Knut Johan Björklund; Tom Bertil Björklund, all of Appelviksvagen 26, 161 36, Brooma, Sweden

[22] Filed: Nov. 20, 1974

[21] Appl. No.: 525,560

[30] Foreign Application Priority Data
Nov. 23, 1973  Sweden .............................. 7315921

[52] U.S. Cl. ............................................. 73/425.6
[51] Int. Cl.² ........................................... B01L 3/02
[58] Field of Search ................ 417/53, 474–478, 417/502, 503; 23/259; 73/425.6; 141/25, 67; 222/1, 212–215

[56] References Cited
UNITED STATES PATENTS

| | | |
|---|---|---|
| 2,351,828 | 6/1944 | Marsh ................... 417/474 |
| 3,263,554 | 8/1966 | Pickels .................. 73/425.6 |
| 3,506,164 | 4/1970 | Weichelbaum ............ 73/425.6 |
| 3,681,030 | 8/1972 | Natalson ................ 73/425.6 |
| 3,786,683 | 1/1974 | Berman .................. 73/425.6 |
| 3,834,590 | 9/1974 | Robinson et al. ......... 73/425.6 |
| 3,888,125 | 6/1975 | Mochida ................. 73/423 A |
| 3,913,636 | 10/1975 | Mochida ................. 23/259 |

*Primary Examiner*—S. Clement Swisher
*Attorney, Agent, or Firm*—Gordon W. Hueschen

[57] ABSTRACT

A serial dilution is effected by sucking a determined increment of liquid to be diluted and air into an elastic tube and discharging both the air and the liquid through a nozzle into a diluting liquid by collapsing the tube at predetermined pressing points in a predetermined cycle.

21 Claims, 5 Drawing Figures

Fig. 2
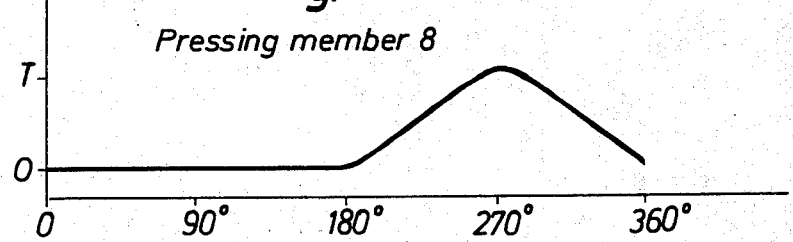
Pressing member 8
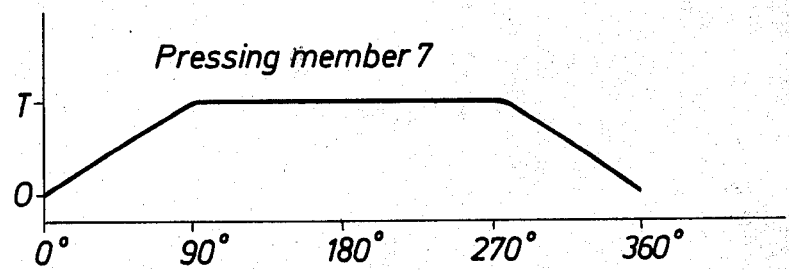
Pressing member 7
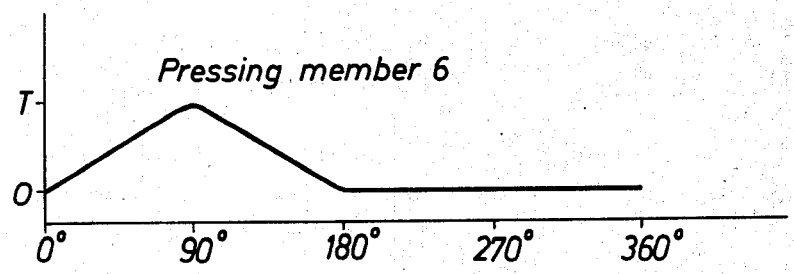
Pressing member 6

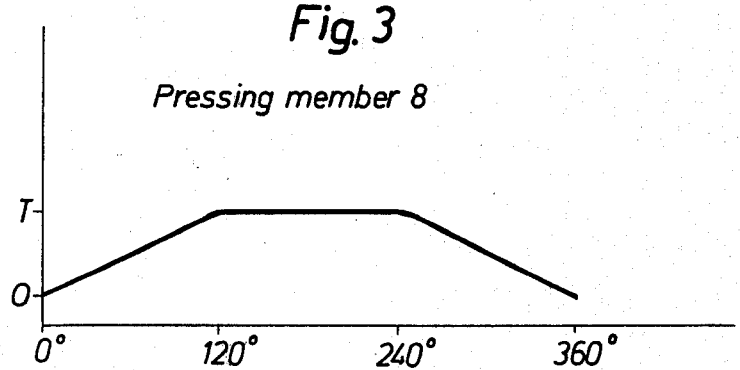
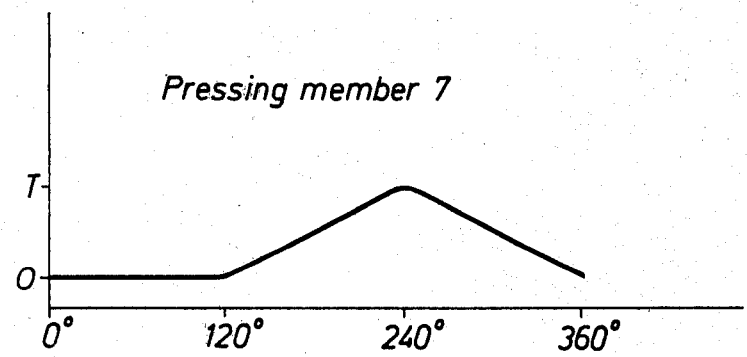
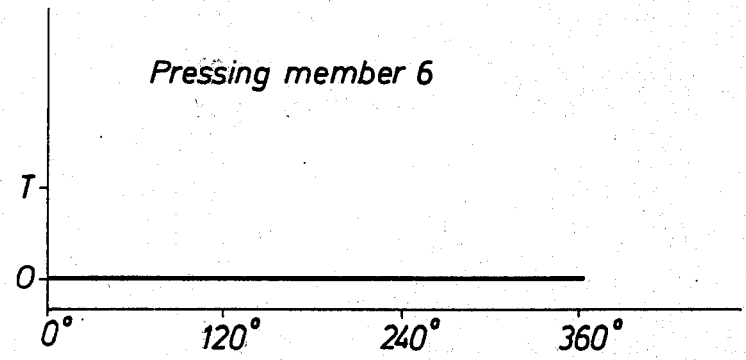

METHOD AND APPARATUS FOR SERIAL DILUTIONS

BACKGROUND OF INVENTION

1. Field of Invention

This invention relates to a method for accurately metering a precise increment of liquid and to apparatus for carrying out the same. It is particularly directed to a method and apparatus in which a precise increment of liquid is admitted into a collapsible chamber together with a quantity of air and the mixture of air and liquid discharged from the chamber through a nozzle by collapsing the chamber. Still more particularly the invention is directed to an improved method and apparatus for effecting serial dilution in which the increment of liquid to be diluted and air are drawn into an elastic tubing and both the air and the liquid are simultaneously discharged from the tubing through a nozzle into a measured amount of dilution liquid by collapsing the elastic tube, and in which the process is repeated as needed to effect the desired number of serial dilutions.

2. Prior Art

Serial dilution has heretofore been effected by drawing the liquid to be diluted into a syringe to a predetermined volume and thereafter squirting it into a measured volume of dilution liquid and repeating this operation step by step until the desired number of serial dilutions is effected. This method and apparatus has the disadvantage that even if the plunger stroke of the syringe is limited by means of end stops in order to permit some automization of the function, the inevitable leakage at the plunger packing could bring about a systematic volume error which is unacceptable in the handling of small liquid volumes, for example, of a magnitude of 25 to 50 microliters. Furthermore, any attempt to cushion the drawing in and expulsion strokes in automated apparatus is likely to introduce errors in the amount of liquid measured out, especially when very small liquid volumes are involved.

OBJECTS

It is an object of the invention to provide improved method and apparatus for measuring out a determined quantity of liquid. It is an object of the invention to effect an improved serial dilution. It is another object of the invention to provide a method and apparatus which permits faster and more accurate serial dilutions. It is another object of the invention to provide a method and apparatus avoiding the drawbacks inherent in the known techniques.

BRIEF DESCRIPTION OF THE DRAWINGS

A preferred embodiment of the invention will be described more particularly below with reference to the accompanying drawings in which:

FIG. 2 is a series of curves showing the programming of the pressing members shown in FIG. 1.

FIG. 3 is an alternative series of curves showing an alternative programming for the pressing members as shown in FIG. 1.

FIGS. 4 and 5 are fragmentary side elevations showing modified forms of the pressing heads of the pressing members.

SUMMARY OF THE INVENTION

Figure 1:
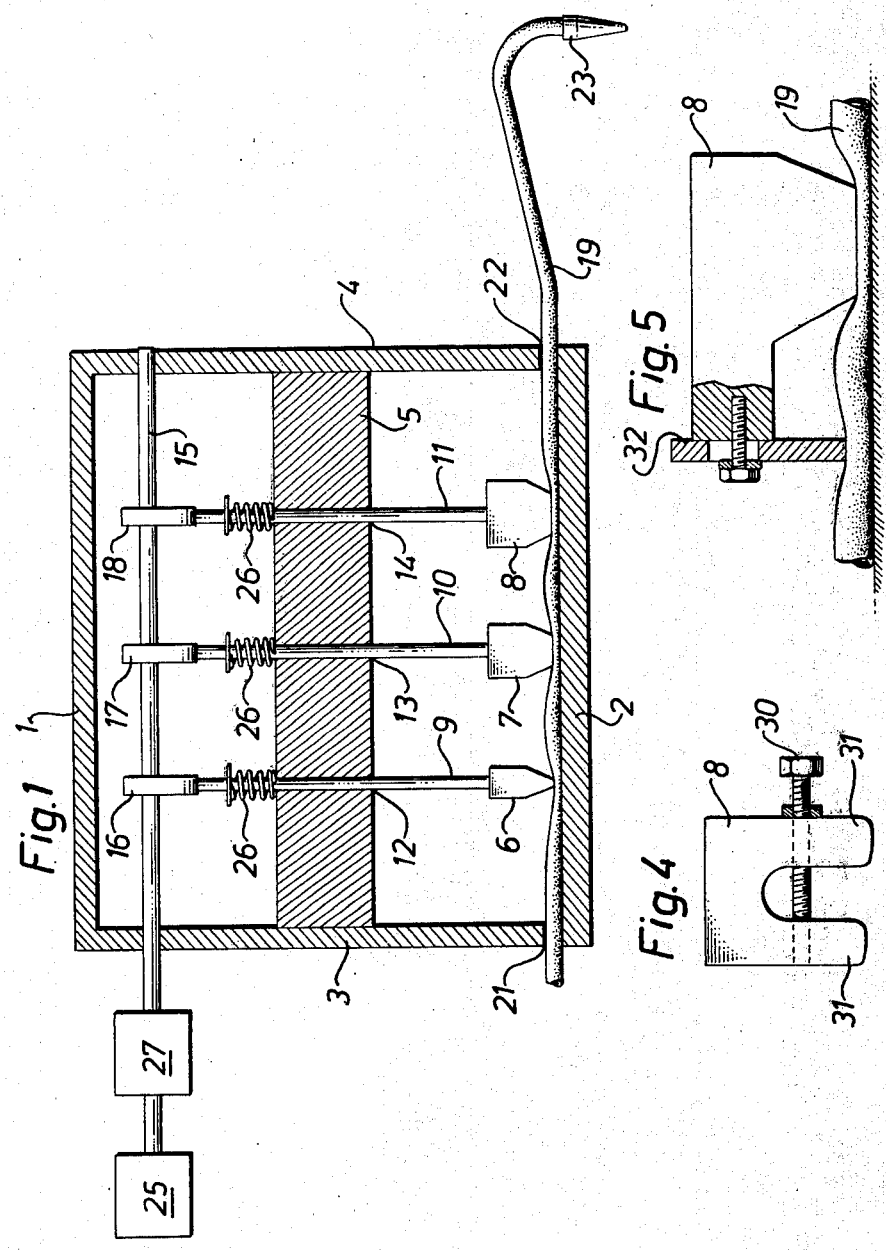
FIG. 1 is a longitudinal section of the device having a plurality of pressing members.

The above objects and others which will become apparent as the description proceeds are accomplished in the present invention for method and apparatus by admitting air and a precise increment of liquid into a collapsible chamber having at least two serially connected collapsible positions which can be expanded to admit fluid and collapsed to discharge the same, said air being admitted by expanding one of said collapsible portions and said increment of liquid being admitted by expanding the other of said collapsible portions, and discharging the liquid and air through a nozzle by collapsing said collapsible portions whereby the air acts to cushion the collapse of said collapsible portions and to promote discharge of the liquid through said nozzle. More particularly, the invention is directed to an improved method and apparatus for effecting serial dilutions in which the liquid to be diluted is drawn into an elastic tubing together with air by expanding collapsed portions of the same and the volumes of air and liquid expelled by collapsing the tubing, the expanding and collapsing being effected at a plurality of press positions and programmed to effect the intake of air and then liquid and the expulsion of the two together. The air and the liquid preferably are expelled into the diluting liquid in order to effect a thorough mixing of the liquid to be diluted with the dilution liquid.

According to a preferred form of the invention, collapsible tubing, which is elastic but substantially nonstretchable in its circumferential direction, is arranged to be collapsed and expanded (unloaded) at a plurality of pressing positions in a programmed sequence designed to first suck in air, then suck in liquid to be diluted, and then to eject both the liquid and the air simultaneously. The programming can be such that, when the liquid and air are simultaneously ejected into the dilution liquid, the thus diluted liquid can be repeatedly sucked in and ejected as necessary or desirable to effect thorough mixing of the two liquids. It is desirable to provide a tube that is open at both ends, one end open to the atmosphere and the other end adapted to be placed into communication with the liquid to be diluted or the dilution liquid as needed. By providing three pressing positions arranged to collapse and expand the tubing in a repetitive programmed sequence, several different types of operation can be effected. In a preferred form, three pressing positions are provided, a liquid intake position, the position nearest or closet to the liquid intake, an air inlet position, the position closet or nearest to the air intake end of the tube, and an intermediate position. Thus, with all the pressing positions in collapsed position, the programming can proceed in the following sequence:

1. Expand the air inlet and intermediate positions to draw in air,
2. Collapse the air inlet position,
3. Expand the liquid inlet position thereby sucking in liquid, and
4. Collapse the intermediate and liquid inlet positions (the liquid intake end is of course at this stage transferred to the dilution liquid in order that the volumes of air and liquid be discharged into the dilution liquid).

In apparatus according to the invention it is of course possible to arrange a plurality of tubes, preferably parallel to each other, provided only that the pressing members are sufficiently wide that they cover all of the tubes. In such manner it is possible to parallelly carry out several dilution series, whereby the dilution part volumes suitably are arranged in parallel rows on a matrix such that the dilution method can be entirely automated.

The movement of the pressing members can be achieved in several ways. As will be described below, the pressing members may be arranged on axially displaceable and guided rods which are actuated by rotating cams. One can, however, also arrange the pressing members at hydraulic or pneumatic piston cylinder units, the movements of which can be controlled electronically by circuits already well known to those skilled in the art.

Further, it is possible to constitute the pressing members of rotating cam discs, which during rotation directly engage the tube, the rotational axis of these cam plates or discs advantageously being arranged parallel to the tube.

The tube used in the apparatus according to the invention need only be elastic at said pressing positions and the tube may there consist of some type of rubber or elastomer which has the desired elastical properties and resistance to the liquids to be dispensed. In order to suck in liquid and air, it should have a good form recovery at least at the pressing position utilized for insucking of liquid.

The apparatus and the method according to the invention is primarily suitable for metering small amounts of liquid, for example 25–50 microliters.

Furthermore it is easy to vary the size of the increment by changing tube dimensions. Also, the use of parallel tubes is a simple way of varying the quantity, if the various tubes have different dimensions.

DESCRIPTION OF THE PREFERRED EMBODIMENTS

Referring more specifically to the drawings, there is illustrated a preferred form of the invention. The metering apparatus according to FIG. 1 has a frame comprising an upper member 1, a bottom member 2, and side members 3 and 4. A guide block 5 is arranged between the side members 3 and 4. The pressing members 6, 7 and 8 are fitted at push rods 9, 10 and 11, respectively, which are guided in apertures 12, 13 and 14, respectively, in the block 5. The apertures and rods have such shape that rotation of the rods is avoided. The cam shaft 15 is rotatably mounted in the side members 3 and 4 above the rods 9–11 in the plane through the rods, and is provided with cam discs 16, 17 and 18, which cooperate with the rods 9–11, respectively.

A tube 19, one end of which communicates with the atmosphere, is pulled through openings 21 and 22 in the side members 3 and 4, respectively, and rests on the bottom member 2 under the pressing members. Springs 26, which rest against the block 5, urge the pressing members 6–8 upwardly so that the rods 9–11 at all times contact the cam discs 16–18. The other end of the tube 19 is provided with a nozzle 23, the point of which is narrow and elongated, the outflow channel having a small section area. In this manner the liquid squirted out attains a high velocity, whereby the formation of drops at the orifice of the nozzle is reduced. This is of significance when the device according to the invention is used for pumping increments in the range of 10–200 microliters, inasmuch as about 50 microliters correspond to one drop of water.

The cam shaft 15 is driven by means of a motor 25 via a coupling 27. This coupling is of the type which at actuation permits the motor 25 to rotate the shaft 15 one revolution or an angle of rotation corresponding to one squirting out and one sucking in cycle. In this manner the operator is given sufficient time to transfer the nozzle to the next volume of liquid to be diluted.

The vertical movement provided to the rods and their pressing members during a working cycle by the cam discs is illustrated in FIG. 2, wherein T refers to a pressing member position corresponding to an unloaded or expanded tube, and wherein 0° refers to a pressing member position corresponding to the tube being collapsed. The shape of the cam discs and their orientation on the shaft can easily be deduced from what is shown in FIG. 2.

In the position 0°, which is the position illustrated in FIG. 1, the tube is collapsed in all positions. Then the pressing member 6, which merely functions as a shut-off valve, and the pressing member 7 are lifted so that air can be sucked into the tube (90°). Then, at 180°, the pressing member 6 is lowered such that the air feed is shut off. At 270° the pressing member 8, which because of its large area is also a displacement member, is lifted so that liquid can be sucked into the nozzle 23. The nozzle is then transferred to next dilution volume, into which the volume just sucked up is discharged by driving the pressing members 7 and 8 downwards to collapse the tube 19.

FIG. 3 shows alternative pressing member movements for the device according to the invention. The work function is equivalent to the case when one works with a tube, one end of which is closed to the atmosphere, the air cushion being sucked in through the nozzle 23, so that only two pressing members are necessary to carry out the work cycle. However, with a device that works according to FIG. 3, more dipping movements are necessary than with the device which operates according to FIG. 2. By sucking in the air cushion through the nozzle channel one achieves, however, the advantage that any micro drops that may have gathered at the point of the nozzle will then be sucked into the nozzle, whereby one avoids the possibility that micro drops are gathered into one drop which eventually will fall off and disturb the dilution.

The area of the pressing members 7 and 8, which is exposed to the tube 19, determines the displacement effect of the pressing member. Thus in FIG. 1, pressing member 6 gives relatively little displacement as compared with pressing member 8, whereas that of pressing member 7 is intermediate. In the sequence of FIG. 2, the area depressed by pressing member 7 is roughly proportional to the air sucked in and retained when positions 6 and 8 are collapsed, whereas that of pressing member 8 is roughly proportional to the amount of liquid sucked in. Thus, by varying these respective areas, the relative amounts of air and liquid can be varied. Generally speaking the ratio of air to liquid (vol/vol) is approximately 1 or less as shown in FIG. 1 by the fact that the area depressed by the pressing member 7 is approximately equal to but less than that depressed by the pressing member 8. It nevertheless can be varied widely on either side, but generally speaking, it is desirable to keep the ratio between 5:1 and 1:5 (vol/vol).

In order to make it possible to adjust the pressing members, especially pressing member 8, for different desired displacement volumes, the pressing member may be U-shaped in accordance with FIG. 4 and may be provided with and adjustment screw 30, which permits setting of different distances between the legs 31 of the pressing member. Thus, by squeezing the legs 31 closer together, the area subtended by the pressing member is made smaller and the displacement volume correspondingly less.

If one wishes to calibrate the displacement volume or to compensate said volume for shape changes of the tube at the pressing position, one can as shown in FIG. 5 arrange an adjustment flange 32 at the pressing member 8, this flange being adjustable in relation to the member 8. A displacement of the flange 32 up or down gives a very small adjustment of the displacement volume.

If one wishes to use other drive means, for example, hydraulic or pneumatic cylinders, for the pressing members, one can equally well use the pattern shown in FIG. 2 or 3 to control the drive means.

Even though the movement pattern of FIG. 2 is preferred, it should be appreciated that these patterns can be varied in many ways without departing from the concept of the invention. One can for example, if desired, by simple modifications of the control curves according to FIG. 2 or 3, prolong the sucking-in step and shorten the feeding-out step during a pumping cycle, instead of having them approximately equal in duration.

The apparatus illustrated can be modified in many ways within the scope of the invention. Thus, the device shown in FIG. 1 may be turned upside down, the springs 26 then being unnecessary. Further, the pressing members may be changeable so that one readily can alter displacement volumes. Further, the movement pattern shown in FIGS. 2 and 3 can be varied in many ways, the essential thing being that the movement of the pressing members is programmed to effect admission of air, then admission of a precise increment of liquid, and then concurrent or simultaneous discharge of the air and the liquid. Also, two or more tubes may be arranged in parallel with each pressing member actuating all of the tubes.

The dimension of the nozzle channel can be adapted to the properties of the fluid which is metered, the minimum section area being determined by the allowable pressure in the tube whereas the maximum section area is determined by the risk that the fluid will flow out by gravity.

It is to be understood that the invention is not to be limited to the exact details of operation or structure shown and described, as obvious modifications and equivalents will be apparent to one skilled in the art.

We claim:
1. A method for accurately metering a precise increment of liquid which comprises, in a repetitive sequence admitting air and a precise increment of liquid into a collapsible chamber having at least two serially connected independently collapsible portions which can be expanded to admit fluid and collapsed to discharge the same, said air being admitted by expanding one of said collapsible portions and said increment of liquid being admitted by expanding the other of said collapsible portions, and discharging the liquid and air through a nozzle by collapsing both said collapsible portions whereby the air acts to push out the liquid and to ensure a total discharge of the liquid through said nozzle.

2. The method of claim 1 in which the air is sucked into one portion of the collapsible chamber through a seperate air intake, the air intake closed, the liquid then sucked into the second portion of the collapsible chamber through a separate liquid intake, and the sucked in air and liquid volumes discharged through the liquid intake by collapsing both portions of the collapsible chamber while maintaining the air intake closed.

3. The method of claim 1 in which the vol/vol ratio of the air and the liquid to be diluted is approximately 1:1 to 1:5.

4. The method of claim 2 in which the vol/vol ratio of the air and the liquid to be diluted is approximately 1:1 to 1:5.

5. The method of claim 1 in which the air is drawn in through the nozzle whereby the air acts to suck in any liquid which may have accumulated in the nozzle or at the orifice thereof.

6. The method of claim 1 which comprises effecting a serial dilution of a predetermined volume of liquid to be diluted having a certain concentration in a series of predetermined volumes of dilution liquid by pressure actuation of an open ended elastic tube, the first end of which is dipped into the liquid to be diluted for sucking up of a predetermined part volume thereof by unloading the tube, whereafter said end of the tube is arranged at a predetermined amount of dilution liquid such that said part volume can be discharged thereinto by collapsing the tube, whereafter a predetermined part volume of the thus diluted liquid repetitively is diluted by corresponding transfers to other predetermined volumes of dilution liquid, and which is characterized in that in connection with the discharge of a liquid volume, the tube is also collapsed at a second pressing position which is seperate from the first pressing position, and in that before a subsequent sucking in of a liquid volume, air is sucked into the tubing by unloading the tubing at one of the said positions.

7. A method according to claim 6, characterized in that the air is sucked into the tube via the second end of the tube, which is always open to atmosphere, by keeping the tube collapsed at a first pressing position, which is situated closest to the first end of the tube, and by unloading the tube at a third pressing position which is situated closest to the second end of the tube, and at the second intermediate pressing position, in that one then collapses the tube at the third pressing position, in that one thereafter unloads the tube at the first pressing position so that it then can suck in a predetermined part volume of liquid, and in that one then squirts out said air volume and the part volume of liquid sucked up, by collapsing the tube at the intermediate position and the first outer position.

8. A method according to claim 6, characterized in that when the second end of the tube is closed to the atmosphere, air is let into the tube by unloading the tube at a first pressing position, whereafter one dips the first end of the tube in a part amount of liquid and sucks up a predetermined part volume thereof by unloading the tube at the second pressing position, whereupon one squirts out said liquid part volume into the next predetermined volume in the dilution series and simultaneously therewith the air by collapsing the tube at both the pressing positions.

9. A method according to claim 6, in which the sucking in and discharge of air and liquid is repeated several times in order to effect a thorough mixing of the dilution liquid and the liquid to be diluted.

10. Apparatus for metering a liquid which comprises a chamber having two communicating independently collapsible portions in communication with single air intake means and single liquid intake and discharge means, collapsing means for independently collapsing one of said portions and collapsing means for independently collapsing the other of said portions and means for actuating said collapsing means in a programmed sequence such that air is drawn into said chamber by expanding one portion of the same and liquid is drawn into said chamber by expanding the other portion of the same, and air and liquid are concurrently discharged through the discharge means by collapsing said chamber.

11. Apparatus according to claim 10 in which one of the collapsible portions of the chamber communicates with a separate air intake means and the other with a separate liquid intake and discharge means and the air intake means has a collapsible portion functioning as a shut-off means, and in which the actuating means is programmed, starting with all positions fully collapsed, to
1. unload the two positions closest to the air intake means,
2. collapse the portion functioning as an air shut-off means,
3. unload the portion nearest the liquid intake and discharge means,
4. collapse the intermediate portion and the position nearest the liquid intake and discharge means whereby to discharge the liquid and air.

12. Apparatus according to claim 11 in which a continuous, unbranched, elongated elastic tube comprises the collapsible portions of the chamber and extends beyond the chamber to comprise at one end the air intake means and at the other the liquid intake and dischare means.

13. Apparatus according to claim 12 for carrying out a serial dilution of a predetermined volume of a first liquid having a certain concentration in a series of predetermined volumes of the dilution liquid by pressure actuation of an elastic tube, the liquid intake and discharge means end of which is dipped into the first liquid for sucking up of predetermined part volume thereof by unloading the tube, whereafer said end of the tube is arranged at a predetermined amount of dilution liquid, such that said part volume can be squirted out thereinto by collapsing the tube, whereafter a predetermined part volume of the thus diluted first liquid repetitively is diluted by corresponding transfers to the other predetermined volumes of the dilution liquid, characterized by at least three pressing members which are arranged to unload and collapse the tube against backings by means of outer drive means at a corresponding number of separate positions along the tube in a repetitive sequence such that the tube first is unloaded at a third pressing position which is situated closest to the air intake means end of the tube, and at a second intermediate pressing position, the tube being held pressed together at a first pressing position which is situated closest to the liquid intake and discharge means end of the tube so that air is sucked into the tube, whereupon the tube is collapsed at the third pressing position and unloaded at the first pressing position so that it then can suck in a part volume of a liquid defined by the displacement volume of the first pressing position, whereupon the air volume sucked in and the liquid volume sucked in are squirted out by collapsing the tube at the first and the second pressing positions.

14. Apparatus according to claim 10 in which a pressing member comprises an adjustment flange which is adjustable with relation to the pressing member toward or away from the tube.

15. Apparatus according to claim 10, in which a continuous, unbranched, elongated elastic tube comprises the collapsible portions of the chamber and extends beyond the chamber to comprise at one end, the air intake means, and at the other end, the liquid intake and discharge means, characterized by at least three pressing members which are arranged to unload and collapse the tube against backings by means of outer drive means at a corresponding number of separate positions along the tube.

16. Apparatus according to claim 15, characterized in that the pressing members are arranged to be lifted by means of the return spring of the tube.

17. Apparatus according to claim 15, characterized in that the drive means comprises cylinder units, which are directly connected to the pressing members to lift and lower them in predetermined sequence.

18. Apparatus according to claim 15 comprising at least two unconnected elastic tubes, characterized in that the tubes are arranged in parallel and that each pressing member actuates all the tubes.

19. Apparatus according to claim 15 in which a pressing member is U-shaped and provided with means for setting of different distances between the legs of the U-shaped pressing member.

20. Apparatus according to claim 15 characterized in that the drive means comprises a rotatably journaled driving shaft, which is provided with cam discs which actuate power transmission means connected to the pressing members.

21. Apparatus according to claim 20, characterized in that the transmission means comprises axially-guided rods.

* * * * *

UNITED STATES PATENT OFFICE
CERTIFICATE OF CORRECTION

Patent No. 3,990,313          Dated November 9, 1976

Inventor(s) Björklund et al.

It is certified that error appears in the above-identified patent and that said Letters Patent are hereby corrected as shown below:

Claim 14, line 1, "claim 10" should read -- claim 15 --.

Claim 12, last line, "dischare" should read -- discharge --.

Signed and Sealed this

Eleventh Day of January 1977

[SEAL]

Attest:

RUTH C. MASON
*Attesting Officer*

C. MARSHALL DANN
*Commissioner of Patents and Trademarks*